US012046857B2

(12) United States Patent
Zhao

(10) Patent No.: US 12,046,857 B2
(45) Date of Patent: Jul. 23, 2024

(54) ELECTRICAL CONNECTOR HAVING A SHIELDING PLATE WITH A PAIR OF SIDE PARTS AND AN OUTSIDE SITUATED CONNECTING PART

(71) Applicants: FUYU ELECTRONICAL TECHNOLOGY (HUAIAN) CO., LTD., Huai'an (CN); FOXCONN INTERCONNECT TECHNOLOGY LIMITED, Grand Cayman (KY)

(72) Inventor: Jun Zhao, Huaian (CN)

(73) Assignees: Fuyu Electronic Technology (Huai'an) Co., Ltd., Huai'an (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 369 days.

(21) Appl. No.: 17/582,154

(22) Filed: Jan. 24, 2022

(65) Prior Publication Data

US 2022/0247129 A1 Aug. 4, 2022

(30) Foreign Application Priority Data

Jan. 30, 2021 (CN) ......................... 202120263717.0

(51) Int. Cl.

| | |
|---|---|
| ***H01R 13/648*** | (2006.01) |
| ***H01R 12/55*** | (2011.01) |
| ***H01R 12/71*** | (2011.01) |
| ***H01R 13/502*** | (2006.01) |
| ***H01R 13/516*** | (2006.01) |
| ***H01R 13/652*** | (2006.01) |
| ***H01R 13/6581*** | (2011.01) |

(52) U.S. Cl.

CPC ........... *H01R 13/652* (2013.01); *H01R 12/55* (2013.01); *H01R 12/71* (2013.01); *H01R 13/502* (2013.01); *H01R 13/516* (2013.01); *H01R 13/648* (2013.01); *H01R 13/6581* (2013.01)

(58) Field of Classification Search

CPC H01R 13/6581; H01R 13/648; H01R 12/707; H01R 12/55

See application file for complete search history.

(56) References Cited

U.S. PATENT DOCUMENTS

| | | | | |
|---|---|---|---|---|
| 8,684,769 B2 * | 4/2014 | Kao | .................. | H01R 13/6585 439/607.28 |
| 9,680,260 B2 * | 6/2017 | Fan | .................... | H01R 13/6593 |
| 9,837,734 B2 * | 12/2017 | Wang | ..................... | H01R 24/60 |
| 9,966,693 B2 * | 5/2018 | Liu | .................... | H01R 13/5213 |
| 9,985,393 B2 * | 5/2018 | Zhao | ...................... | H01R 24/60 |

(Continued)

FOREIGN PATENT DOCUMENTS

CN 208336559 U 1/2019

*Primary Examiner* — Vanessa Girardi

(74) *Attorney, Agent, or Firm* — Ming Chieh Chang

(57) ABSTRACT

An electrical connector includes: an insulative housing having a base and a tongue; an upper row of contacts and a lower row of contacts secured to the insulative housing and exposed to two opposite faces of the tongue; and a shielding plate having a pair of side parts situated between the upper row of contacts and the lower row of contacts along an up-and-down direction and a connecting part coupled between the pair of side parts, wherein the connecting part of the shielding plate is situated at an outer side of the upper and lower rows of contacts.

5 Claims, 10 Drawing Sheets

(56) References Cited

U.S. PATENT DOCUMENTS

| | | | | |
|---|---|---|---|---|
| 10,044,125 | B2 * | 8/2018 | Qiu | H01R 24/60 |
| 10,062,992 | B2 * | 8/2018 | Zhao | H01R 13/6597 |
| 10,063,015 | B2 * | 8/2018 | Zhao | H01R 13/6593 |
| 10,135,196 | B2 * | 11/2018 | Wen | H01R 24/62 |
| 10,153,566 | B2 * | 12/2018 | Zhang | H01R 13/6658 |
| 10,297,957 | B2 * | 5/2019 | Zhao | H01R 12/724 |
| 10,333,257 | B2 * | 6/2019 | Tseng | H01R 24/60 |
| 10,454,206 | B2 * | 10/2019 | Zhao | H01R 13/6581 |

* cited by examiner

ELECTRICAL CONNECTOR HAVING A SHIELDING PLATE WITH A PAIR OF SIDE PARTS AND AN OUTSIDE SITUATED CONNECTING PART

BACKGROUND OF THE INVENTION

1. Field of the Invention

The present invention relates to an electrical connector comprising two row of contacts and a middle shielding plate between the two rows of contacts.

2. Description of Related Arts

China Patent No. 208336559 discloses an electrical connector comprising: an insulative housing having a base and a tongue; an upper row of contacts and a lower row of contacts secured to the insulative housing and exposed to two opposite faces of the tongue; and a planar shielding plate having a substantial middle part situated close to the upper and lower rows of contacts.

SUMMARY OF THE INVENTION

An electrical connector comprises: an insulative housing having a base and a tongue; an upper row of contacts and a lower row of contacts secured to the insulative housing and exposed to two opposite faces of the tongue; and a shielding plate having a pair of side parts situated between the upper row of contacts and the lower row of contacts along an up-and-down direction and a connecting part coupled between the pair of side parts, wherein the connecting part of the shielding plate is situated at an outer side of the upper and lower rows of contacts.

DETAILED DESCRIPTION OF THE PREFERRED EMBODIMENT

Figure 1:
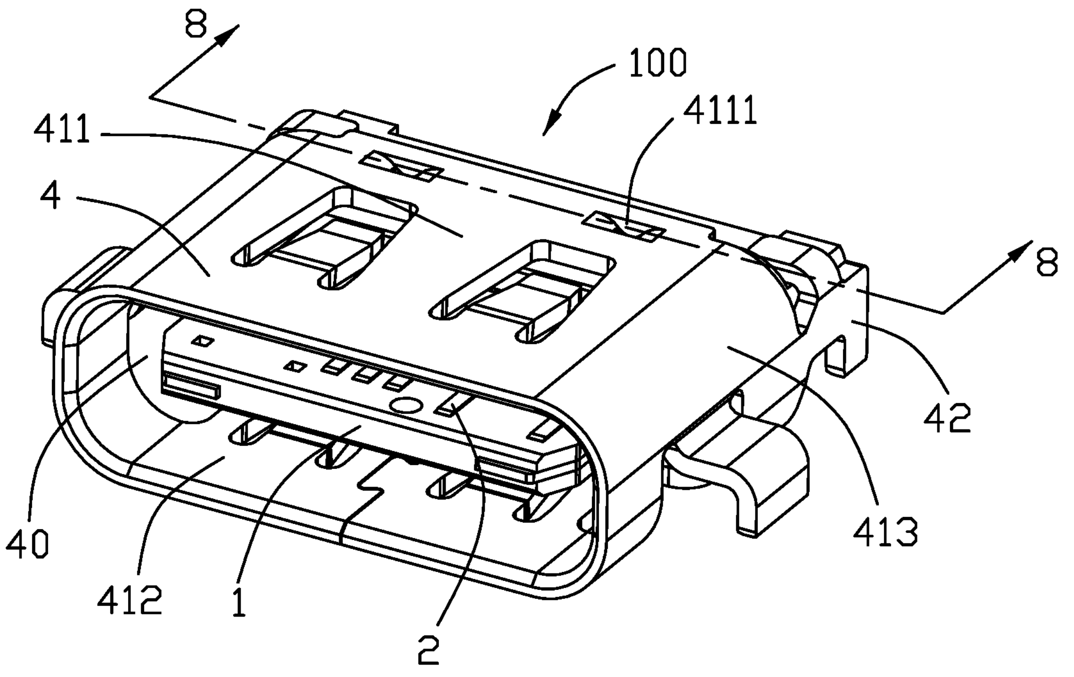
FIG. 1 is a perspective view of an electrical connector in accordance with the present invention.
Figure 2:
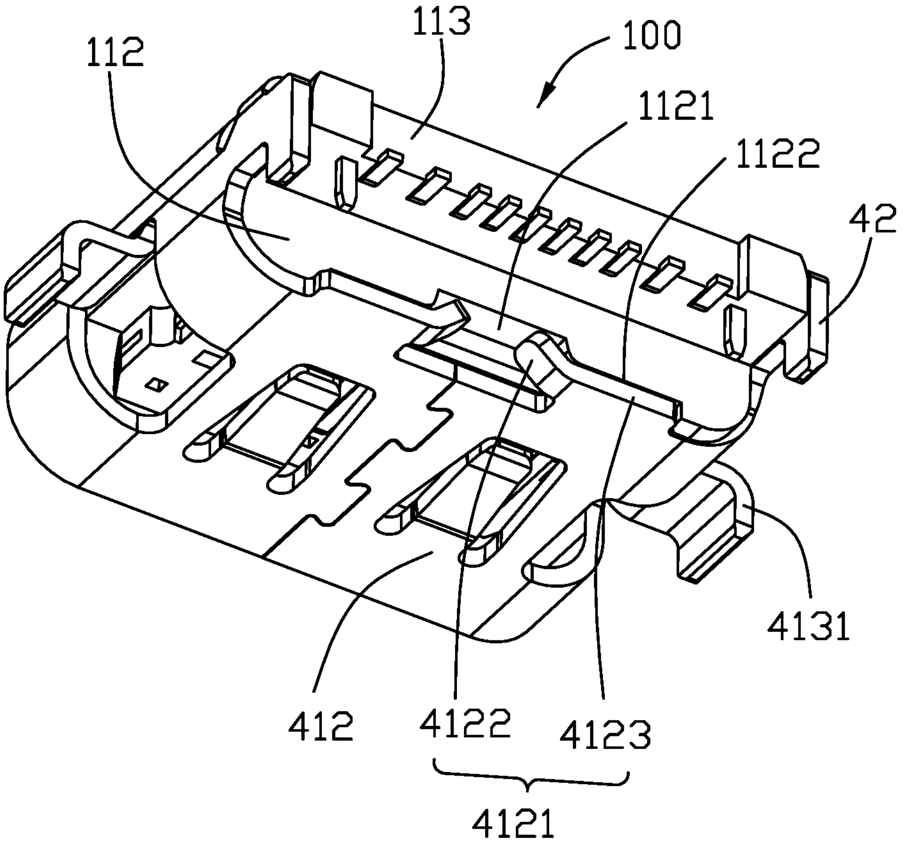
FIG. 2 is another perspective view of the electrical connector.
Figure 3:
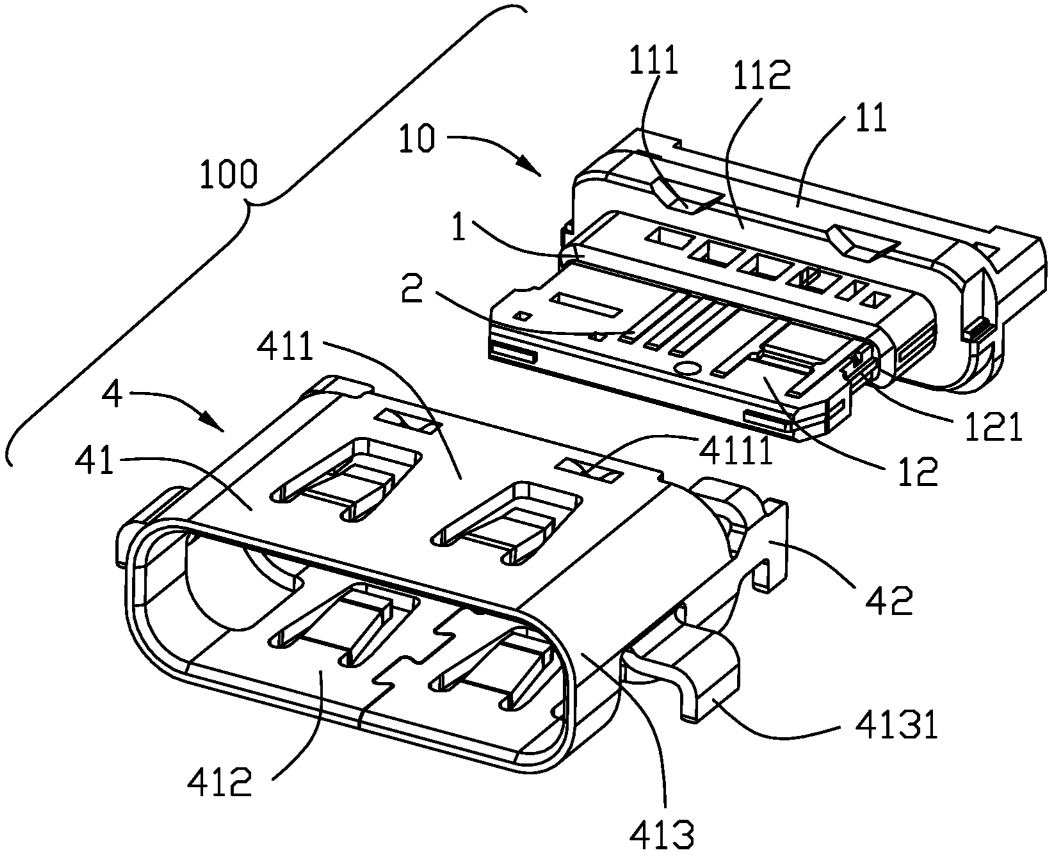
FIG. 3 is an exploded view of the electrical connector.
Figure 4:
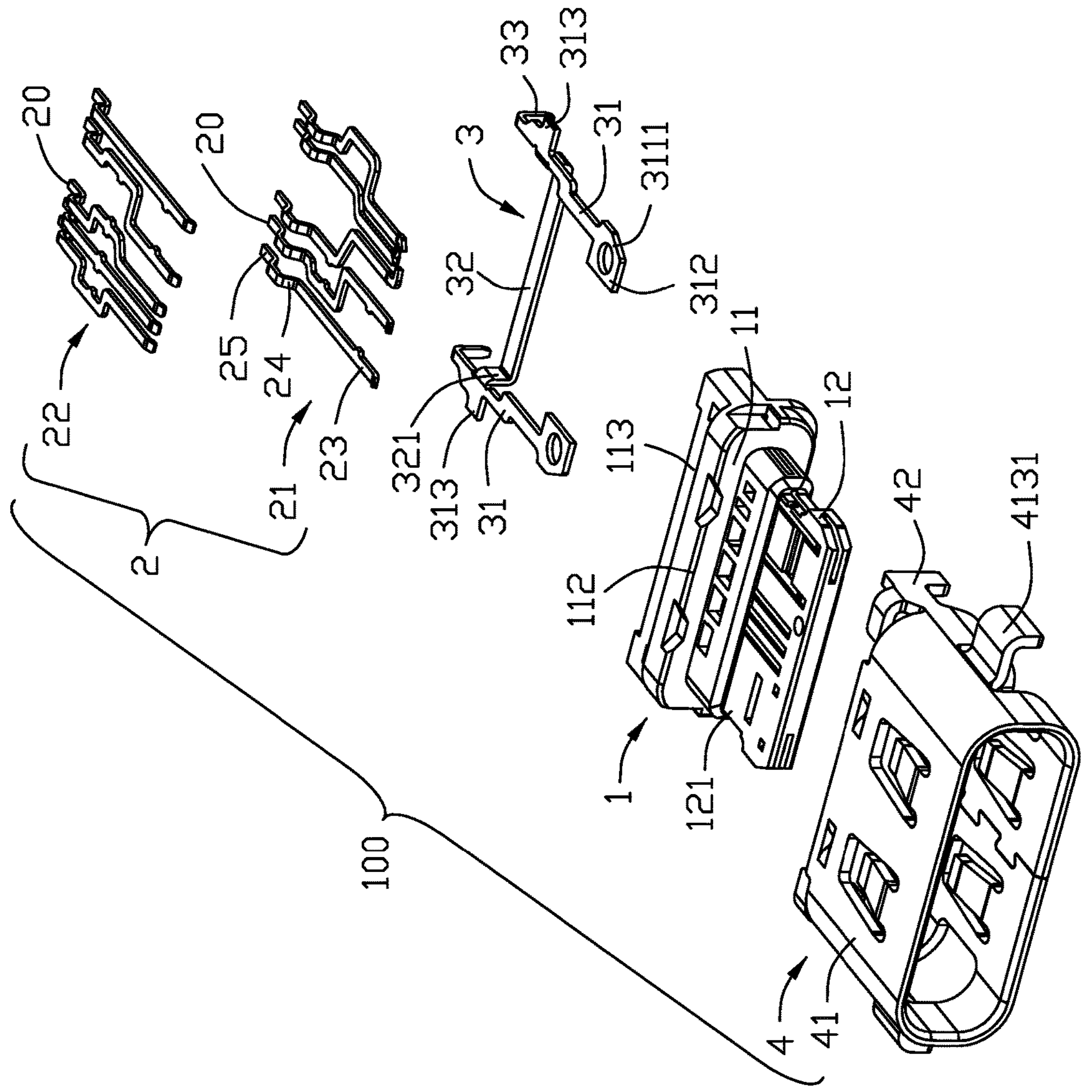
FIG. 4 is a further exploded view of the electrical connector.
Figure 5:
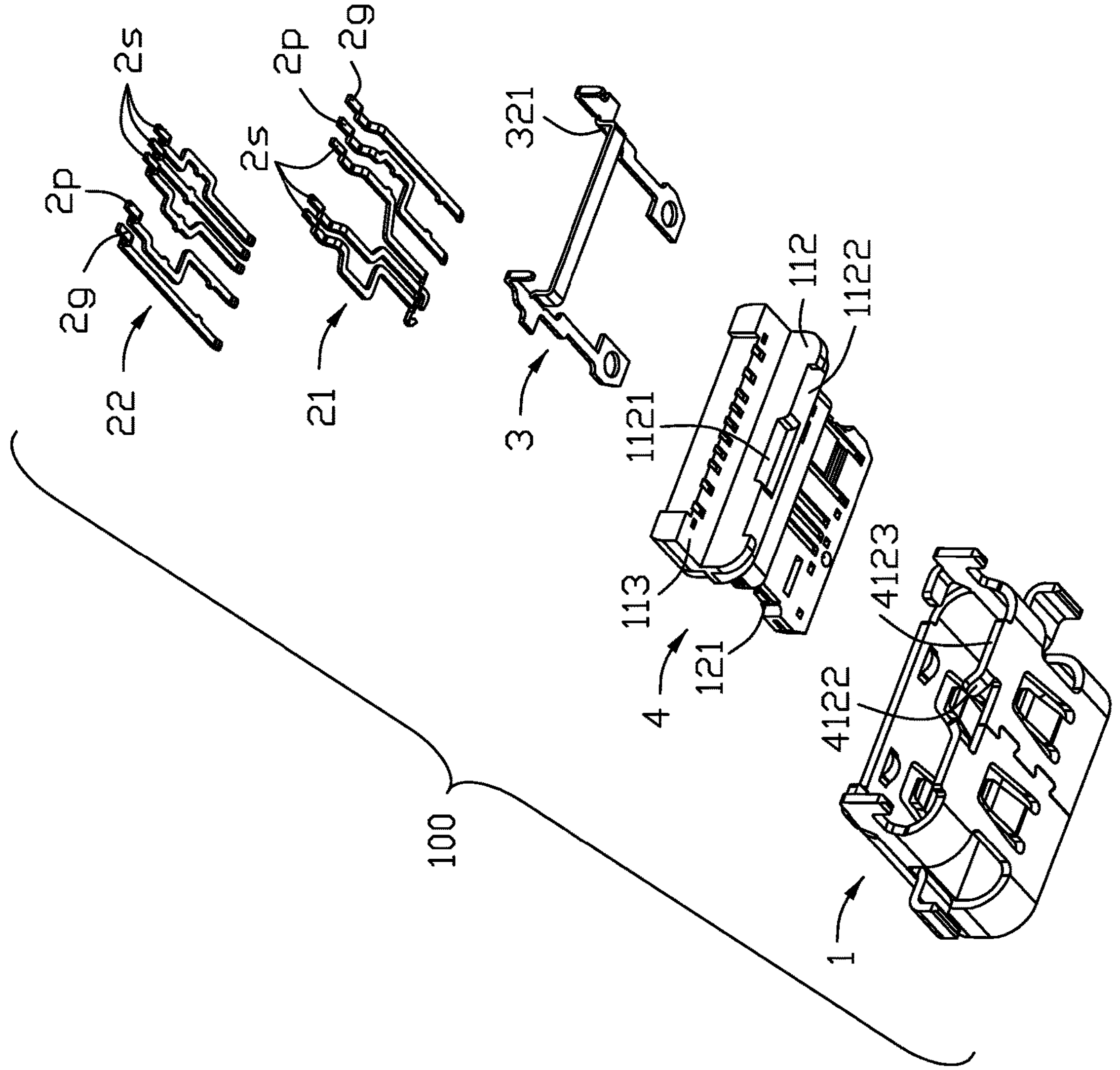
FIG. 5 is view similar to FIG. 4 but from another perspective.
Figure 6:
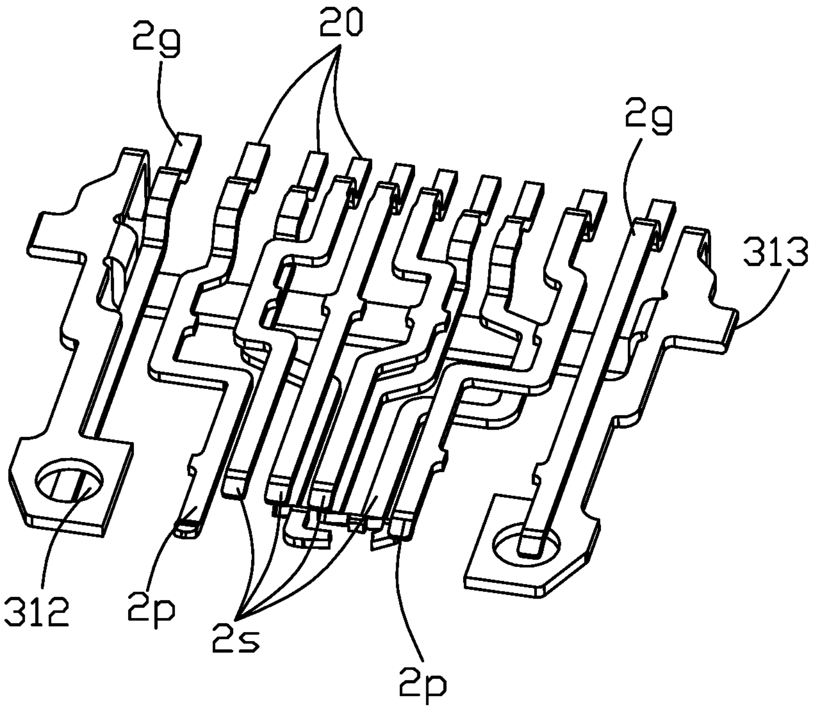
FIG. 6 is view showing positional relationship between two rows of contact and a shielding plate of the electrical connector.
Figure 7:
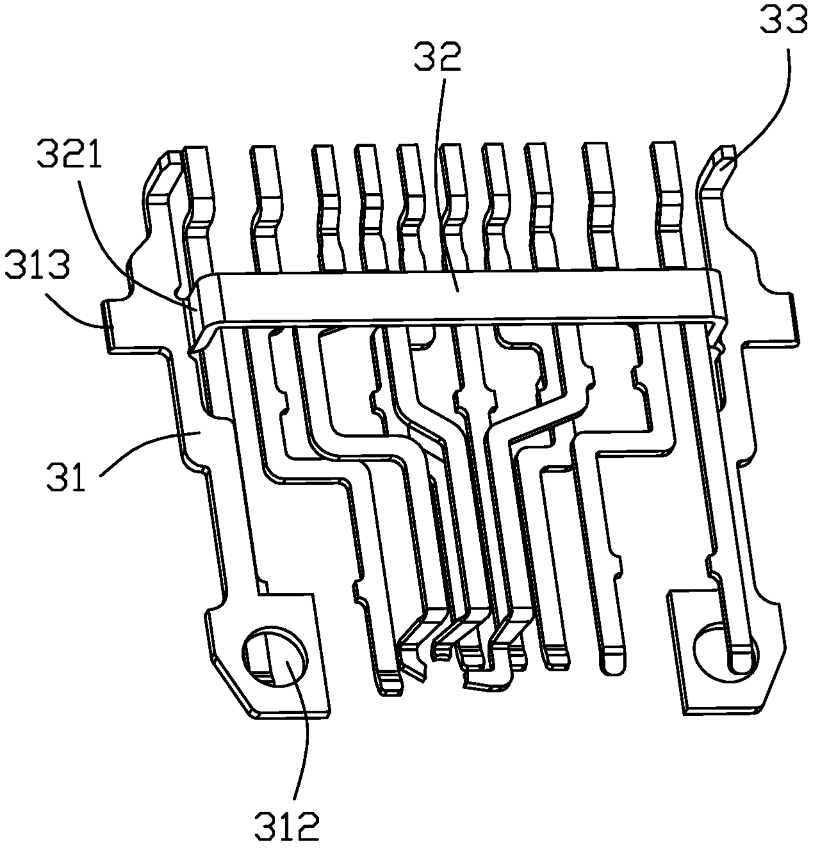
FIG. 7 is view similar to FIG. 6 but from another perspective.
Figure 8:
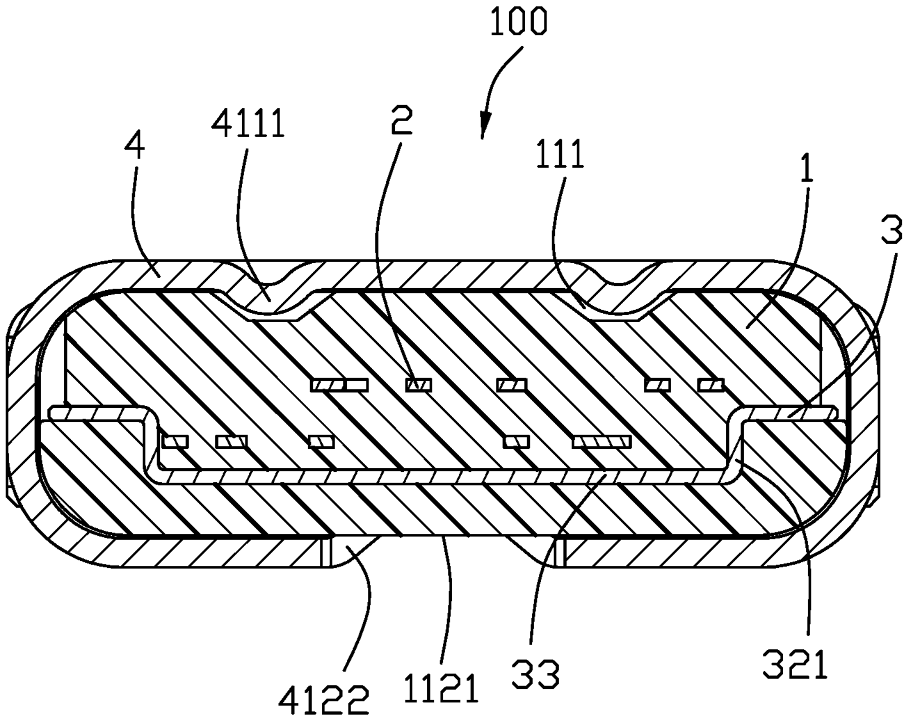
FIG. 8 is a cross-sectional view of the electrical connector taken along line A-A in FIG. 1.
Figure 9:
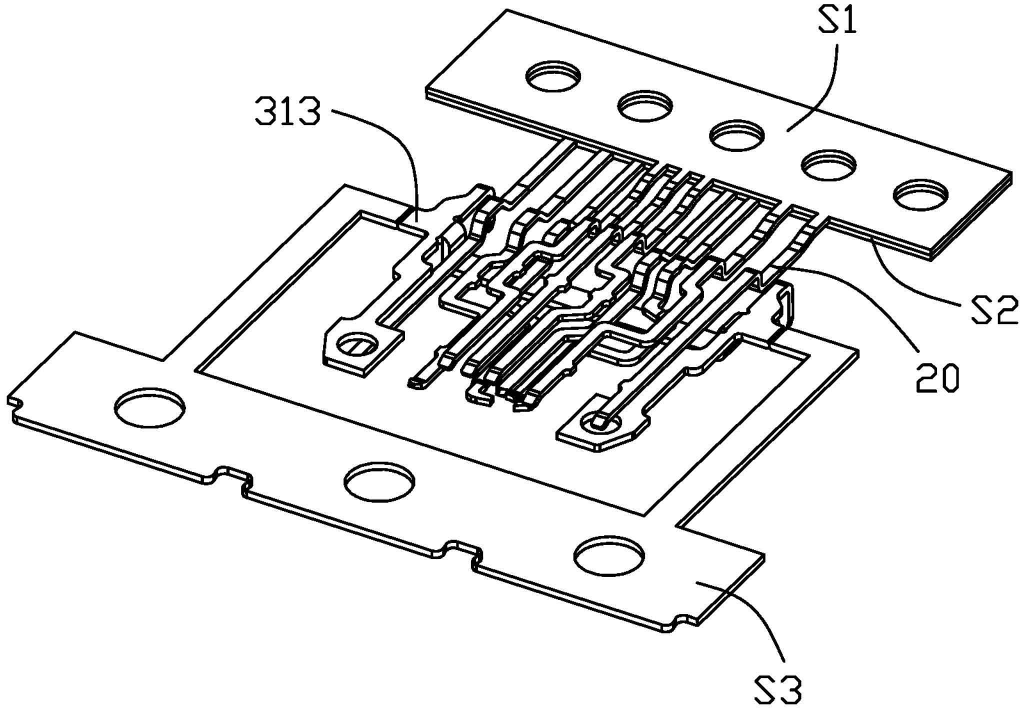
FIG. 9 is view similar to FIG. 6 along with respective carrier strips.
Figure 10:
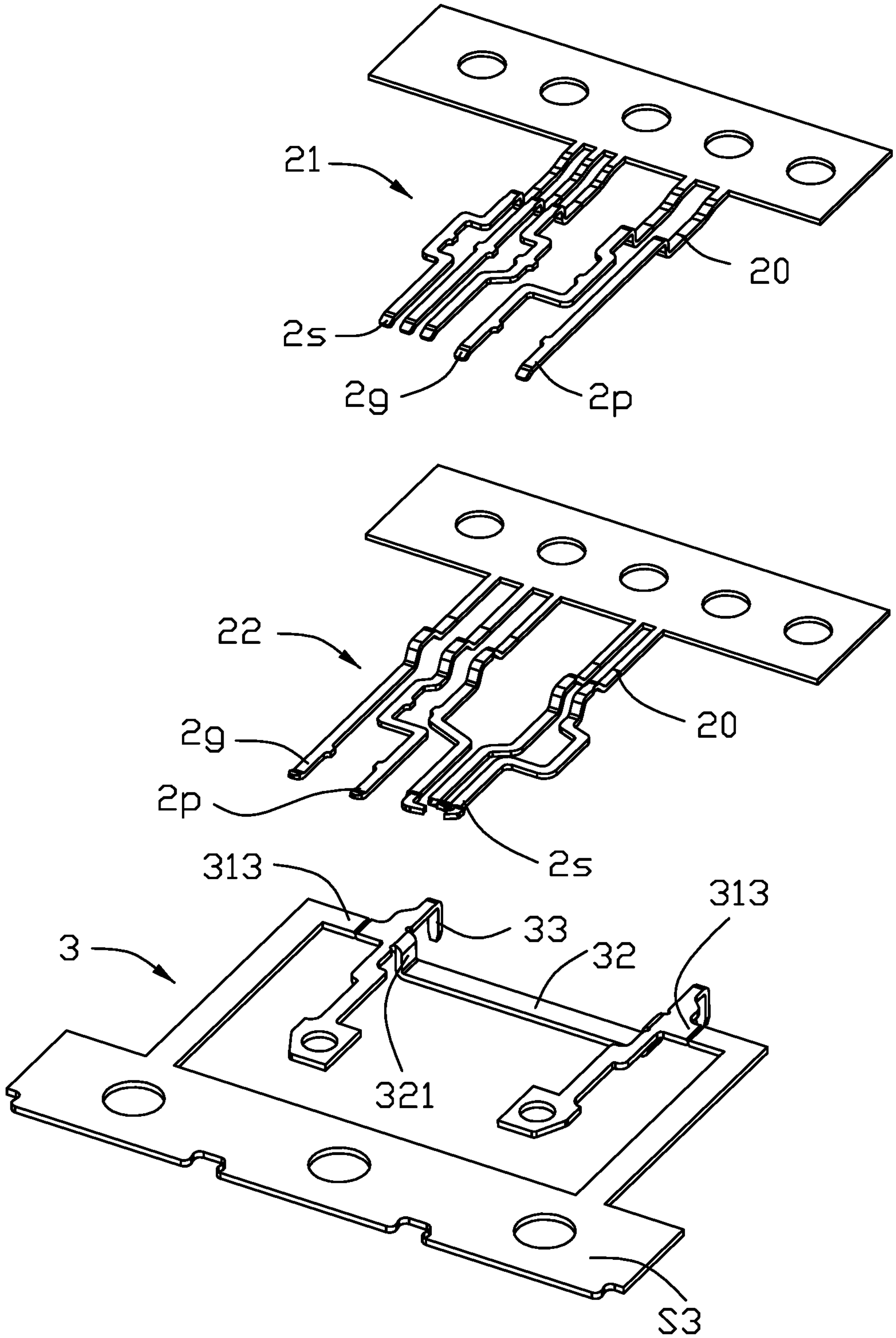
FIG. 10 is an exploded view of FIG. 9.

Referring to FIGS. 1 to 10, an electrical connector 100 comprises a contact module 10 and an outer shell 4. The contact module 10 includes: an insulative housing 1 having a base 11 and a tongue 12; an upper row of contacts 21 and a lower row of contacts 22 secured to the insulative housing 1 and exposed to two opposite faces of the tongue 12; and a shielding plate 3 having a pair of side parts 31 situated between the upper row of contacts and the lower row of contacts 2 along an up-and-down direction and a connecting part 32 coupled between the pair of side parts 31. The base 11 has a stop wall 112 and a narrowed portion 113. A thickness of the stop wall 112 of the base 11 is greater than a thickness of the tongue 12 and the connecting part 32 of the shielding plate 3 is embedded in the stop wall 112. The base 11 has a pair of first slots 111, a second slot 1121, and a pair of steps 1122. The tongue 12 has a pair of side notches 121.

Each contact 2 includes a contacting portion 23, a securing portion 24, and a soldering portion 25. Each row of contacts 21 or 22 include an outermost ground contact 2*g*, a power contact 2*p* next to the ground contact 2*g*, and plural signal contacts 2*s* next to the power contact 2*p*. The soldering portion 25 of the contact 2 is to be severed at position 20, during manufacturing, from a contact carrier strip. Before severing, the upper row of contacts 21 are connected with a first carrier strip S1 and the lower row of contacts 22 are connected with a second carrier strip S2.

The shielding plate 3 further includes a pair of soldering legs 33 each extending from a corresponding side part 31. The connecting part 32 of the shielding plate 3 is bent from inner sides of the pair of side parts 31 to have a U-shape. The connecting part 32 is situated at an outer side of the upper and lower rows of contacts 21 and 22. A vertical distance between the connecting part 32 and the power contact 2*p* may be made greater than a vertical distance between the power contact 2*p* and the side part 32. During manufacturing, the pair of side parts 31 are connected with a third carrier strip S3 at protrusions 313 thereof which are lined up with bent portions 321 of the connecting part 32 and are to engage the outer shell 4. Each side part 31 has a head 311 with a hole 312.

The outer shell 4 encloses the base 11 of the insulative housing 1 and together with the tongue 12 defines a mating chamber 40. The outer shell 4 includes a tubular part 41 and a pair of soldering legs 42. The tubular part 41 has an upper wall 411, a lower wall 412, and a pair of side walls 413. The upper wall 411 has a pair of abutments 4111 and the lower wall 412 has a pair of abutments 4121. The abutment 4121 has a finger 4122 and a portion 4123 bearing against the step 1122. Each side wall 413 has a leg 4131 for mounting to a printed circuit board.

Compared to prior art of either only two separate side parts without any connecting part or a shielding plate entirely between two rows of contacts, provision of the connecting part 32 of the shielding plate 3 at an outer side of the upper and lower rows of contacts 21 and 22 enables an easier manufacturing process while avoiding a bulk material of the shielding situated between a limited space between an upper row of contacts and a lower row of contacts.

What is claimed is:

1. An electrical connector comprising:

an insulative housing having a base and a tongue;

an upper row of contacts and a lower row of contacts secured to the insulative housing and exposed to two opposite faces of the tongue; and a shielding plate having a pair of side parts situated between the upper row of contacts and the lower row of contacts along an up-and-down direction and a connecting part coupled between the pair of side parts; wherein the connecting part of the shielding plate is situated at an outer side of the upper and lower rows of contacts.

2. The electrical connector as claimed in claim 1, wherein the connecting part of the shielding plate is embedded in the base.

3. The electrical connector as claimed in claim 1, wherein the shielding plate includes a pair of soldering legs each extending from a corresponding side part.

4. The electrical connector as claimed in claim 1, further comprising an outer shell enclosing the insulative housing, and wherein each of the pair of side parts has a protrusion engaging the outer shell.

5. The electrical connector as claimed in claim 1, wherein a vertical distance between the connecting part and an adjacent row of the upper and lower rows of contacts is greater than a vertical distance between the adjacent row of contacts and the pair of side parts.

* * * * *